US012799255B2

(12) United States Patent
Hsieh

(10) Patent No.: US 12,799,255 B2
(45) Date of Patent: Nov. 17, 2026

(54) RESIN COMPOSITION AND ARTICLE MADE THEREFROM

(71) Applicant: Elite Material Co., Ltd., Taoyuan City (TW)

(72) Inventor: Chen-Yu Hsieh, Taoyuan City (TW)

(73) Assignee: ELITE MATERIAL CO., LTD., Taoyuan City (TW)

(*) Notice: Subject to any disclaimer, the term of this patent is extended or adjusted under 35 U.S.C. 154(b) by 490 days.

(21) Appl. No.: 18/532,694

(22) Filed: Dec. 7, 2023

(65) Prior Publication Data

US 2025/0136739 A1 May 1, 2025

(30) Foreign Application Priority Data

Oct. 25, 2023 (TW) ................................ 112140768

(51) Int. Cl.
*C08F 283/04* (2006.01)

(52) U.S. Cl.
CPC ................................ *C08F 283/045* (2013.01)

(58) Field of Classification Search
CPC ............................ C08F 283/045; C08G 73/12
See application file for complete search history.

(56) References Cited

U.S. PATENT DOCUMENTS

2021/0139691 A1* 5/2021 Zhang ....................... B32B 5/26
2023/0135428 A1* 5/2023 Chang ..................... C08L 51/08
523/206

FOREIGN PATENT DOCUMENTS

WO WO 2020096036 * 5/2020

OTHER PUBLICATIONS

Machine Translation of WO2020096036 Description Section (Year: 2020).*

* cited by examiner

*Primary Examiner* — John M Cooney
*Assistant Examiner* — Adam J Berro
(74) *Attorney, Agent, or Firm* — MUNCY, GEISSLER, OLDS & LOWE, P.C.

(57) ABSTRACT

A resin composition includes a polymer, which has a first structural unit of Formula (1) and a second structural unit of Formula (2). The resin composition may be used to make a prepreg, a resin film, a laminate or a printed circuit board, and at least one of the following properties can be improved, including dielectric constant, dissipation factor, copper foil peeling strength and warpage at high temperature.

Formula (1)

(Continued)

-continued
Formula (2)
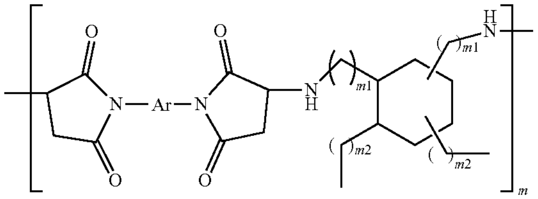
10 Claims, 1 Drawing Sheet

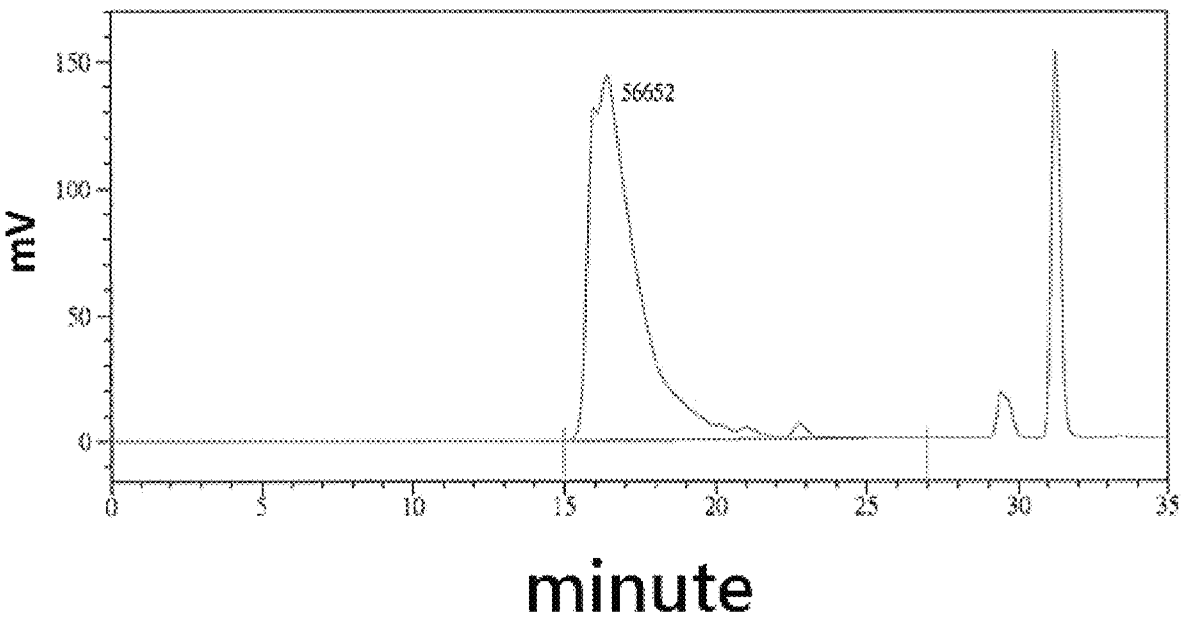
150
100
50
0
mV
56652
0
5
10
15
20
25
30
35
minute

RESIN COMPOSITION AND ARTICLE MADE THEREFROM

CROSS-REFERENCE TO RELATED APPLICATION

This application claims the priority benefits of Taiwan Patent Application No. 112140768, filed on Oct. 25, 2023. The entirety of the above-mentioned patent application is hereby incorporated by reference herein and made a part of this specification.

BACKGROUND

1. Field of the Disclosure

The present disclosure relates to a resin composition and more particularly to a resin composition useful for preparing a prepreg, a resin film, a laminate or a printed circuit board.

2. Description of Related Art

In recent years, due to the development of electronic signal transmission toward 5G and the trend of miniaturization and high performance of electronic equipment, communication devices and personal computers, circuit boards were also developed toward multi-layer configuration, high density trace interconnection, and high speed signal transmission, thereby presenting higher challenges to the overall performance of circuit laminates such as copper-clad laminates.

In order to improve the dielectric properties of a circuit laminate, conventional technology primarily focuses on adjusting the type or ratio of the components of the raw material resin composition. For example, compounds containing hydrocarbons have been used in existing resin materials to improve dielectric properties. However, an article made from the resin materials such as a laminate still fails to meet the demands in properties.

SUMMARY

To overcome the problems of prior arts, particularly one or more above-mentioned property demands facing conventional materials, it is a primary object of the present disclosure to provide a resin composition and an article made therefrom which may overcome at least one of the above-mentioned technical problems.

To achieve the above-mentioned objects, the present disclosure provides a resin composition, comprising a polymer (hereafter also referred to as the "polymer of the present disclosure") which has a first structural unit of Formula (1) and a second structural unit of Formula (2):

Formula (1)

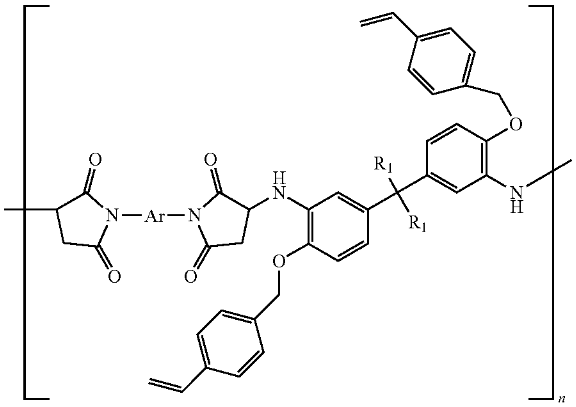

Formula (2)

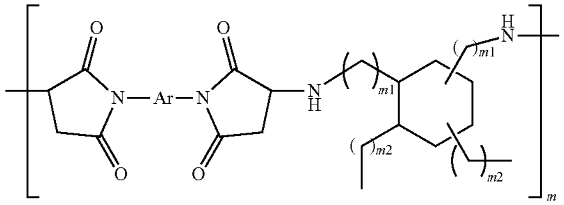

wherein Ar are the same or different and independently represent a divalent organic group; $R_1$ are the same or different and independently represent a methyl group or a trifluoromethyl group; m1 are the same or different and independently represent an integer of 6 to 8; m2 are the same or different and independently represent an integer of 5 to 8; and n/m is between 1 and 3, such that the polymer has a weight average molecular weight of between 30,000 and 70,000.

For example, in one embodiment, the resin composition further comprises inorganic filler, flame retardant, curing accelerator, polymerization inhibitor, solvent, silane coupling agent, coloring agent, toughening agent, or a combination thereof.

For example, in one embodiment, the resin composition further comprises a multi-functional aromatic vinyl group-containing compound.

For example, in one embodiment, the resin composition comprises 100 parts by weight of the polymer and 5 to 30 parts by weight of the multi-functional aromatic vinyl group-containing compound.

For example, in one embodiment, the multi-functional aromatic vinyl group-containing compound comprises a compound of Formula (7), a compound of Formula (8) or a combination thereof:

Formula (7)

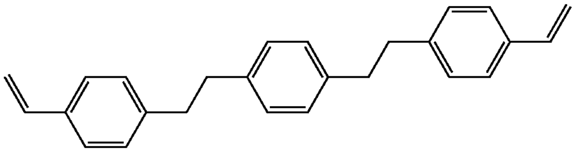

Formula (8)

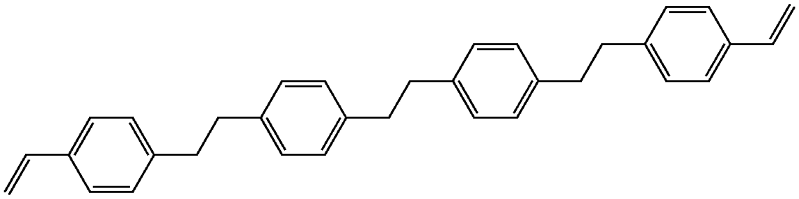

To achieve the above-mentioned objects, the present disclosure further provides an article made from the resin composition, including a prepreg, a resin film, a laminate or a printed circuit board.

For example, in one embodiment, articles made from the resin composition disclosed herein have one, more or all of the following properties:

a dielectric constant as measured by reference to JIS C2565 at 10 GHz of less than or equal to 2.77;

a dissipation factor as measured by reference to JIS C2565 at 10 GHz of less than or equal to 0.00168;

a copper foil peeling strength as measured by reference to IPC-TM-650 2.4.8 of greater than or equal to 3.31 lb/in; and a warpage as measured after 30 minutes of thermal treatment at 200° C. of less than or equal to 1.93 mm.

BRIEF DESCRIPTION OF THE DRAWINGS

The sole figure illustrates the gel permeation chromatography (GPC) spectrum of the product (Polymer P1) obtained in Preparation Example 1.

DESCRIPTION OF THE EMBODIMENTS

To enable those skilled in the art to further appreciate the features and effects of the present disclosure, words and terms contained in the specification and appended claims are described and defined. Unless otherwise defined, all technical and scientific terms used herein have the same meaning as commonly understood by those of ordinary skill in the art to which this disclosure pertains. In the case of conflict, the present document and definitions contained herein will control.

As used herein, the term "comprises," "comprising," "includes," "including," "encompass," "encompassing," "has," "having" or any other variant thereof is construed as an open-ended transitional phrase intended to cover a non-exclusive inclusion. For example, a composition or article of manufacture that comprises a list of elements is not necessarily limited to only those elements but may include other elements not expressly listed but inherent to such composition or article of manufacture. Further, unless expressly stated to the contrary, the term "or" refers to an inclusive or and not to an exclusive or. For example, a condition "A or B" is satisfied by any one of the following: A is true (or present) and B is false (or not present), A is false (or not present) and B is true (or present), and both A and B are true (or present). In addition, whenever open-ended transitional phrases are used, such as "comprises," "comprising," "includes," "including," "encompass," "encompassing," "has," "having" or any other variant thereof, it is understood that transitional phrases such as "consisting essentially of" and "consisting of" are also disclosed and included.

In this disclosure, features or conditions presented as a numerical range or a percentage range are merely for convenience and brevity. Therefore, a numerical range or a percentage range should be interpreted as encompassing and specifically disclosing all possible subranges and individual numerals or values therein, particularly all integers therein. For example, a range of "1 to 8" should be understood as explicitly disclosing all subranges such as 1 to 7, 2 to 8, 2 to 6, 3 to 6, 4 to 8, 3 to 8 and so on, particularly all subranges defined by integers, as well as disclosing all individual values such as 1, 2, 3, 4, 5, 6, 7 and 8. Similarly, a range of "between 1 and 8" should be understood as explicitly disclosing all ranges such as 1 to 8, 1 to 7, 2 to 8, 2 to 6, 3 to 6, 4 to 8, 3 to 8 and so on and encompassing the end points of the ranges. Unless otherwise defined, the aforesaid interpretation rule should be applied throughout the present disclosure regardless broadness of the scope.

Whenever amount, concentration or other numeral or parameter is expressed as a range, a preferred range or a series of upper and lower limits, it is understood that all ranges defined by any pair of the upper limit or preferred value and the lower limit or preferred value are specifically disclosed, regardless whether these ranges are explicitly described or not. In addition, unless otherwise defined, whenever a range is mentioned, the range should be interpreted as inclusive of the endpoints and every integers and fractions in the range.

Given the intended purposes and advantages of this disclosure are achieved, numerals or FIGURES have the precision of their significant digits. For example, 40.0 should be understood as covering a range of 39.50 to 40.49.

As used herein, a Markush group or a list of items is used to describe examples or embodiments of the present disclosure. A skilled artisan will appreciate that all subgroups of members or items and individual members or items of the Markush group or list can also be used to describe the present disclosure. For example, when X is described as being "selected from a group consisting of $X_1$, $X_2$ and $X_3$," it is intended to disclose the situations of X is $X_1$ and X is $X_1$ and/or $X_2$ and/or $X_3$. In addition, when a Markush group or a list of items is used to describe examples or embodiments of the present disclosure, a skilled artisan will understand that any subgroup or any combination of the members or items in the Markush group or list may also be used to describe the present disclosure. Therefore, for example, when X is described as being "selected from a group consisting of $X_1$, $X_2$ and $X_3$" and Y is described as being "selected from a group consisting of $Y_1$, $Y_2$ and $Y_3$," the disclosure shall be interpreted as any combination of X is $X_1$ or $X_2$ or $X_3$ and Y is $Y_1$ or $Y_2$ or $Y_3$.

Unless otherwise specified, in the present disclosure, the term "resin" is a widely used common name of a synthetic polymer and is construed in the present disclosure as comprising monomer and its combination, polymer and its combination or a combination of monomer and its polymer, but not limited thereto. A combination of monomers refers to a group formed by multiple monomers. For example, in the present disclosure, the term "maleimide resin" is construed to encompass a maleimide monomer, a maleimide polymer, a combination of maleimide monomers, a combination of maleimide polymers, or a combination of maleimide monomer(s) and maleimide polymer(s). A resin may include a compound and/or a mixture.

Unless otherwise specified, according to the present disclosure, a compound refers to a chemical substance formed by two or more elements bonded with chemical bonds and may comprise a small molecule compound and a polymer compound, but not limited thereto. Any compound disclosed herein is interpreted to not only include a single chemical substance but also include a class of chemical substances having the same kind of components or having the same property. In addition, as used herein, a mixture refers to a combination of two or more compounds.

As used herein, part(s) by weight represents weight part(s) in any weight unit, such as but not limited to gram, kilogram, pound and so on. For example, 100 parts by weight of the polymer may represent 100 grams of the polymer, 100 kilograms of the polymer or 100 pounds of the polymer, but not limited thereto.

The following embodiments and examples are illustrative in nature and are not intended to limit the present disclosure and its application. In addition, the present disclosure is not bound by any theory described in the background and summary above or the following embodiments or examples.

As described above, a primary object of the present disclosure is to provide a resin composition, comprising a polymer which has a first structural unit of Formula (1) and a second structural unit of Formula (2):

Formula (1)

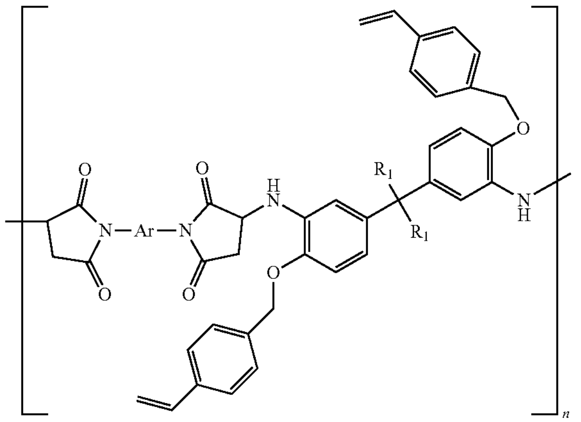

-continued

Formula (2)

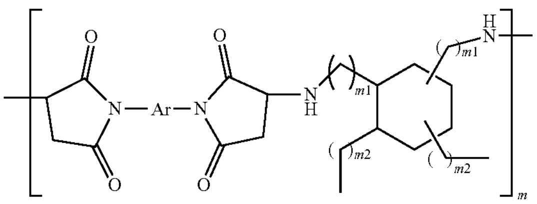

wherein Ar are the same or different and independently represent a divalent organic group; $R_1$ are the same or different and independently represent a methyl group or a trifluoromethyl group; m1 are the same or different and independently represent an integer of 6 to 8; m2 are the same or different and independently represent an integer of 5 to 8; and n/m is between 1 and 3, such that the polymer has a weight average molecular weight of between 30,000 and 70,000.

For example, in the polymer of the present disclosure, Ar may be any divalent organic group as shown below, but not limited thereto:

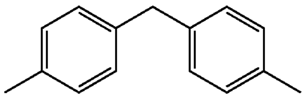

;

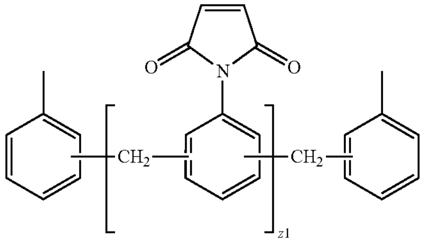

, wherein z1 represents a repeating number of the unit, and it may be 1 to 10;

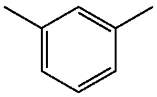

;

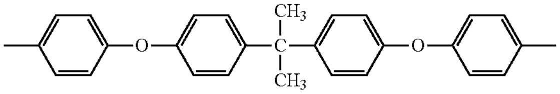

;

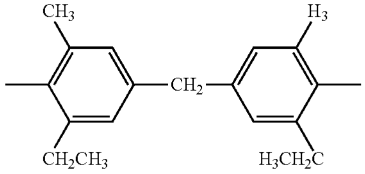

;

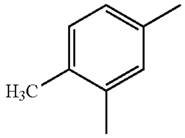

;

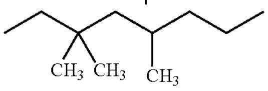

;

-continued
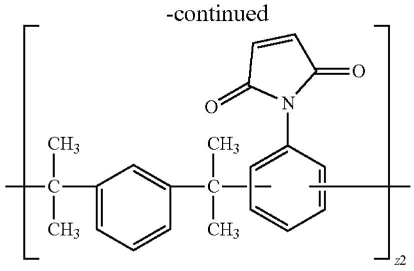
,
wherein z2 represents a repeating number of the unit, and 1≤z2≤5;
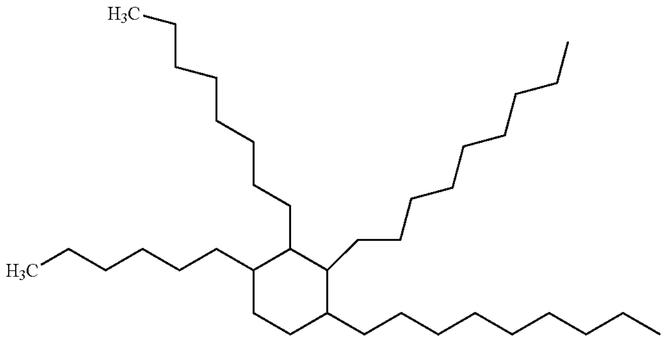
;
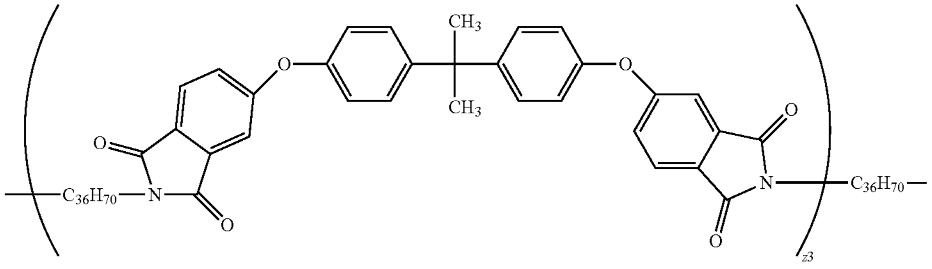
,
wherein z3 represents a repeating number of the unit, and 1≤z3≤10;
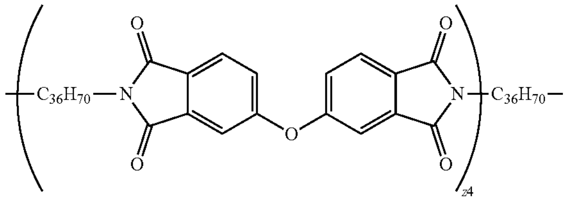
,
wherein z4 represents a repeating number of the unit, and it may be 1.3;
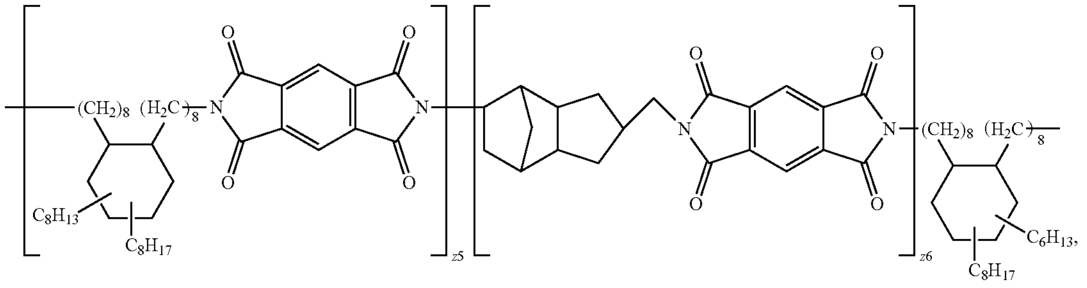

wherein z5 and z6 respectively represent a repeating number of the unit, and both z5 and z6 are 3 (average); and

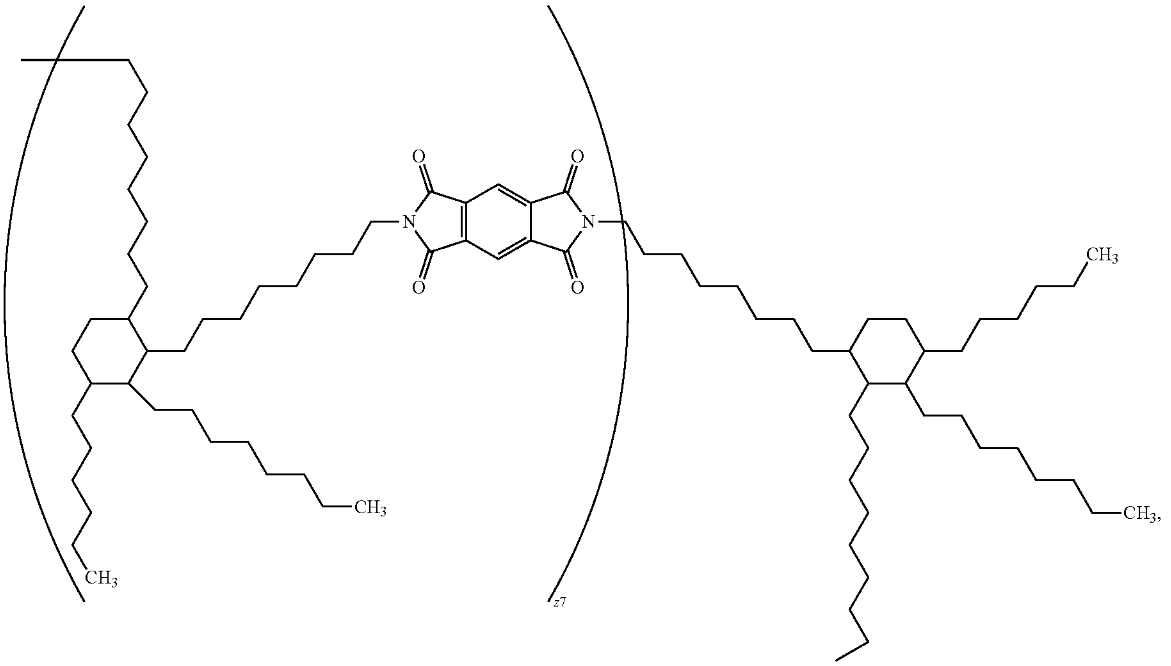

wherein z7 represents a repeating number of the unit, and 1≤z7≤10.

For example, in one embodiment, in Formula (1), n may be between 5 and 45; in Formula (2), m may be between 3 and 32, but not limited thereto.

For example, in one embodiment, the polymer of the present disclosure refers to a product obtained by polymerizing maleimide resin, a first diamine compound containing two hydroxyl groups, a second diamine compound with 15 to 45 carbon atoms and a vinyl group-containing halide, and it has a first structural unit of Formula (1) and a second structural unit of Formula (2).

For example, in one embodiment, the polymer of the present disclosure may also further use a siloxane-containing third diamine compound in the polymerization reaction.

Examples of the siloxane-containing third diamine compound include, but are not limited to, products such as PAM-E, KF-8010, X-22-161A, X-22-161B, KF-8012, KF-8008, X-22-1660B-3 and X-22-9409 available from Shin-Etsu Chemical Co., Ltd. or products such as NH-02-D, NH-15-D, NH-30-D, NH-130-D and NH-200-D available from WACKER.

For example, in one embodiment, one of the technical features of the polymer of the present disclosure is that it still retains a vinyl functional group after polymerization, and the vinyl functional group can further undergo a crosslinking reaction.

In addition to the aforesaid polymer of the present disclosure, the resin composition of the present disclosure may optionally further comprise maleimide resin, vinyl group-containing polyphenylene ether resin, polyolefin resin or a combination thereof.

The maleimide resin may include 4,4'-diphenylmethane bismaleimide, polyphenylmethane maleimide (a.k.a. oligomer of phenylmethane maleimide), bisphenol A diphenyl ether bismaleimide, 3,3'-dimethyl-5,5'-diethyl-4,4'-diphenylmethane bismaleimide, m-phenylene bismaleimide, 4-methyl-1,3-phenylene bismaleimide, 1,6-bismaleimide-(2,2,4-trimethyl) hexane, aromatic propylene-linked maleimide resin or maleimide resin containing aliphatic long chain structure.

For example, examples of the maleimide resin include but are not limited to products such as BMI-1000, BMI-1000H, BMI-1100, BMI-1100H, BMI-2000, BMI-2300, BMI-3000, BMI-3000H, BMI-4000, BMI-5000, BMI-5100, BMI-TMH, BMI-7000, and BMI-7000H available from Daiwakasei Industry, products such as BMI-70 and BMI-80 available from K.I Chemical Industry Co., Ltd. or products such as MIR-5000 available from Nippon Kayaku. For example, examples of the maleimide resin containing aliphatic long chain structure (such as containing $C_5$ to $C_{50}$ aliphatic long chain structure) include, but are not limited to, products such as BMI-689, BMI-1400, BMI-1500, BMI-1700, BMI-2500, BMI-3000, BMI-5000 and BMI-6000 available from Designer Molecules Inc.

The vinyl group-containing polyphenylene ether resin represents a polyphenylene ether resin containing a vinyl group, and examples thereof may include but not limited to a polyphenylene ether resin containing a vinyl group, an allyl group, a vinylbenzyl group or a methacrylate group. For example, in one embodiment, the vinyl group-containing polyphenylene ether resin comprises a vinylbenzyl-containing biphenyl polyphenylene ether resin, a methacrylate-containing polyphenylene ether resin (i.e., methacryloyl-containing polyphenylene ether resin), an allyl-containing polyphenylene ether resin, a vinylbenzyl-modified bisphenol A polyphenylene ether resin, a chain-extended vinyl group-containing polyphenylene ether resin or a combination thereof. For example, the vinyl group-containing polyphenylene ether resin may be a vinylbenzyl-containing biphenyl polyphenylene ether resin with a number average molecular weight of about 1200 (such as OPE-2st 1200, available from Mitsubishi Gas Chemical Co., Inc.), a vinylbenzyl-containing biphenyl polyphenylene ether resin with a number average molecular weight of about 2200 (such as OPE-2st 2200, available from Mitsubishi Gas Chemical Co., Inc.), a methacrylate-containing polyphenylene ether resin with a number average molecular weight of about 1900 to 2300 (such as SA9000, available from Sabic), a vinylbenzyl-modified bisphenol A polyphenylene ether resin with a number average molecular weight of about 2400 to 2800, a chain-extended vinyl group-containing polyphenylene ether resin with a number average molecular weight of about 2200 to 3000, or a combination thereof. The chain-extended vinyl group-containing polyphenylene ether resin may include various polyphenylene ether resins disclosed in the US Patent Application Publication No. 2016/0185904 A1, all of which are incorporated herein by reference in their entirety.

The polyolefin resin may comprise, but not limited to, polybutadiene, polyisoprene, styrene-butadiene copolymer, styrene-isoprene copolymer, styrene-butadiene-divinylbenzene terpolymer, maleic anhydride-adducted butadiene-styrene copolymer, vinyl-polybutadiene-urethane oligomer, maleic anhydride-adducted polybutadiene, polymethylstyrene, hydrogenated polybutadiene, hydrogenated styrene-butadiene-divinylbenzene terpolymer, hydrogenated maleic anhydride-adducted polybutadiene-styrene copolymer, hydrogenated styrene-butadiene copolymer, hydrogenated styrene-isoprene copolymer or a combination thereof.

In addition to the aforesaid polymer, the resin composition disclosed herein may also further optionally comprise inorganic filler, flame retardant, curing accelerator, polymerization inhibitor, solvent, silane coupling agent, coloring agent, toughening agent, or a combination thereof. Unless otherwise specified, relative to 100 parts by weight of the polymer of the present disclosure, the content of any aforesaid component may be 0.5 to 300 parts by weight, such as 5, 10, 20, 30, 40, 50, 60, 70, 80, 90, 100, 150, 200, 250 or 300 parts by weight, such as 30 to 150 parts by weight or 200 to 300 parts by weight.

For example, the inorganic filler may be any one or more inorganic fillers suitable for preparing a prepreg, a resin film, a laminate or a printed circuit board, examples including but not limited to silica (fused, non-fused, porous or hollow type), aluminum oxide, aluminum hydroxide, magnesium oxide, magnesium hydroxide, calcium carbonate, aluminum nitride, boron nitride, aluminum silicon carbide, silicon carbide, titanium dioxide, barium titanate, lead titanate, strontium titanate, calcium titanate, magnesium titanate, barium zirconate, lead zirconate, magnesium zirconate, lead zirconate titanate, zinc molybdate, calcium molybdate, magnesium molybdate, ammonium molybdate, zinc molybdate-modified talc, zinc oxide, zirconium oxide, mica, boehmite (AlOOH), calcined talc, talc, silicon nitride, or calcined kaolin. Moreover, the inorganic filler can be spherical, fibrous, plate-like, particulate, flake-like or whisker-like in shape and can be optionally pretreated by a silane coupling agent. For example, relative to a total of 100 parts by weight of the polymer of the present disclosure, the amount of inorganic filler used in the present disclosure is not particularly limited, and may range from 50 parts by weight to 200 parts by weight, preferably 100 parts by weight to 150 parts by weight.

For example, the flame retardant used herein may be any one or more flame retardants useful for preparing a prepreg, a resin film, a laminate or a printed circuit board, examples including but not limited to a phosphorus-containing flame retardant, preferably comprising ammonium polyphosphate, hydroquinone bis-(diphenyl phosphate), bisphenol A bis-(diphenylphosphate), tri(2-carboxyethyl) phosphine (TCEP), phosphoric acid tris(chloroisopropyl) ester, trimethyl phosphate (TMP), dimethyl methyl phosphonate (DMMP), resorcinol bis(dixylenyl phosphate) (RDXP, such as commercially available PX-200, PX-201, and PX-202), phosphazene (such as commercially available SPB-100, SPH-100, and SPV-100), melamine polyphosphate, DOPO (9,10-dihydro-9-oxa-10-phosphaphenanthrene-10-oxide) and its derivatives or resins, DPPO (diphenylphosphine oxide) and its derivatives or resins, melamine cyanurate, tri-hydroxy ethyl isocyanurate, aluminium phosphinate (e.g., commercially available OP-930 and OP-935), and a combination thereof.

For example, the flame retardant may be a DPPO compound (e.g., di-DPPO compound, such as commercially available PQ-60), a DOPO compound (e.g., di-DOPO compound), a DOPO resin (e.g., DOPO-HQ, DOPO-NQ, DOPO-PN, and DOPO-BPN) and a DOPO-containing epoxy resin, wherein DOPO-PN is a DOPO phenol novolac compound, and DOPO-BPN may be a DOPO-containing bisphenol novolac compound, such as DOPO-BPAN (DOPO-bisphenol A novolac), DOPO-BPFN (DOPO-bisphenol F novolac) or DOPO-BPSN (DOPO-bisphenol S novolac).

For example, the curing accelerator (including curing initiator) may comprise a catalyst, such as a Lewis base or a Lewis acid. The Lewis base may comprise any one or more of imidazole, boron trifluoride-amine complex, ethyltriphenyl phosphonium chloride, 2-methylimidazole (2MI), 2-phenyl-1H-imidazole (2PZ), 2-ethyl-4-methyl imidazole (2E4MI), triphenylphosphine (TPP) and 4-dimethylaminopyridine (DMAP). The Lewis acid may comprise metal salt compounds, such as those of manganese, iron, cobalt, nickel, copper and zinc, such as zinc octanoate or cobalt octanoate. The curing accelerator also includes a curing initiator, such as a peroxide capable of producing free radicals, examples of curing initiator including but not limited to dicumyl peroxide, tert-butyl peroxybenzoate, dibenzoyl peroxide (BPO), 2,5-dimethyl-2,5-di(tert-butyl peroxy)-3-hexyne (25B), bis(tert-butylperoxyisopropyl) benzene or a combination thereof. For example, relative to a total of 100 parts by weight of the polymer of the present disclosure, the amount of curing accelerator used in the present disclosure may range from 0.01 to 5 parts by weight, preferably 0.5 to 2 parts by weight.

For example, the polymerization inhibitor may comprise, but not limited to, 1,1-diphenyl-2-picrylhydrazyl radical, methyl acrylonitrile, 2,2,6,6-tetramethyl-1-oxo-piperidine, dithioester, nitroxide-mediated radical, triphenylmethyl radical, metal ion radical, sulfur radical, hydroquinone, 4-methoxyphenol, p-benzoquinone, phenothiazine, β-phenylnaphthylamine, 4-t-butylcatechol, methylene blue, 4,4'-butylidenebis(6-t-butyl-3-methylphenol), 2,2'-methylenebis (4-ethyl-6-t-butyl phenol) or a combination thereof. For example, the nitroxide-mediated radical may comprise, but not limited to, nitroxide radicals derived from cyclic hydroxylamines, such as 2,2,6,6-substituted piperidine 1-oxyl free radical, 2,2,5,5-substituted pyrrolidine 1-oxyl free radical or the like. Preferred substitutes include alkyl groups with 4 or fewer carbon atoms, such as methyl group or ethyl group. Examples of the compound containing a nitroxide radical include but are not limited to 2,2,6,6-tetramethylpiperidine 1-oxyl free radical, 2,2,6,6-tetraethylpiperidine 1-oxyl free radical, 2,2,6,6-tetramethyl-4-oxo-piperidine 1-oxyl free radical, 2,2,5,5-tetramethyl pyrrolidine 1-oxyl free radical, 1,1,3,3-tetramethyl-2-isoindoline oxygen radical, N,N-di-tert-butylamine oxygen free radical and so on. Nitroxide radicals may also be replaced by using stable radicals such as galvinoxyl radicals. The polymerization inhibitor suitable for the resin composition of the present disclosure may include products derived from the polymerization inhibitor with its hydrogen atom or group substituted by other atom or group. Examples include products derived from a polymerization inhibitor with its hydrogen atom substituted by an amino group, a hydroxyl group, a carbonyl group or the like.

For example, the solvent suitable for the resin composition of the present disclosure is not particularly limited and may be any solvent suitable for dissolving the resin composition disclosed herein, examples including, but not limited to, methanol, ethanol, ethylene glycol monomethyl ether, anisole, acetone, butanone (methyl ethyl ketone), methyl isobutyl ketone, cyclohexanone, toluene, xylene, methoxyethyl acetate, ethoxyethyl acetate, propoxyethyl acetate, ethyl acetate, dimethylformamide, dimethylacetamide, propylene glycol methyl ether, or a mixture thereof. The amount of solvent is not particularly limited and may be adjusted according to the viscosity required for the resin composition.

For example, the silane coupling agent may comprise silane (such as but not limited to siloxane) and may be further categorized according to the functional groups into amino silane, epoxide silane, vinyl silane, acrylate silane, methacrylate silane, hydroxyl silane, isocyanate silane, methacryloxy silane and acryloxy silane.

For example, the coloring agent may comprise but not limited to dye or pigment.

As used herein, the purpose of adding toughening agent is to improve the toughness of the resin composition. For example, the toughening agent may comprise, but not limited to, carboxyl-terminated butadiene acrylonitrile rubber (CTBN rubber), core-shell rubber, or a combination thereof.

In addition, in one embodiment, in addition to the polymer of the present disclosure, the resin composition of the present disclosure may also optionally comprise a multi-functional aromatic vinyl group-containing compound. For example, in one embodiment, the resin composition of the present disclosure comprises 100 parts by weight of a polymer and 5 to 30 parts by weight of a multi-functional aromatic vinyl group-containing compound.

The multi-functional aromatic vinyl group-containing compound refers to a compound containing two or more aromatic vinyl groups in the structure, and the structure thereof is not particularly limited. For example, in one embodiment, the multi-functional aromatic vinyl group-containing compound comprises a compound of Formula (7), a compound of Formula (8) or a combination thereof:

Formula (7)

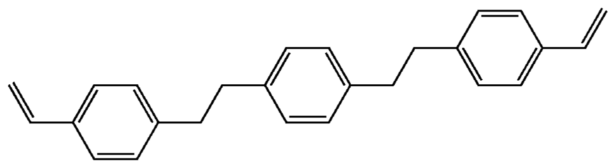

Formula (8)

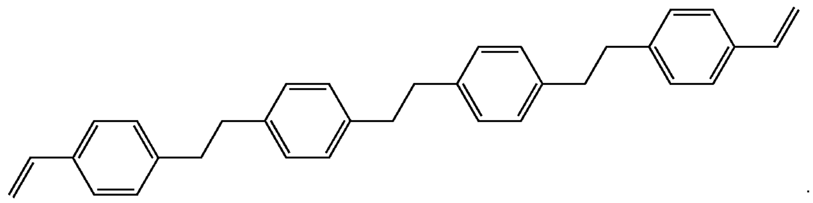

The resin composition of various embodiments may be processed to make different articles, such as those suitable for use as components in electronic products, including but not limited to a prepreg, a resin film, a laminate or a printed circuit board.

For example, the resin composition from each embodiment of this disclosure can be used to make a prepreg, which comprises a reinforcement material and a layered structure disposed thereon. The layered structure is formed by heating the resin composition at a high temperature to the semi-cured state (B-stage). Suitable baking temperature for making a prepreg may be for example 90° C. to 140° C., preferably 100° C. to 120° C. The reinforcement material may be any one of a fiber material, woven fabric, and non-woven fabric, and the woven fabric preferably comprises fiberglass fabrics. Types of fiberglass fabrics are not particularly limited and may be any commercial fiberglass fabric used for various printed circuit boards, such as E-glass fabric, D-glass fabric, S-glass fabric, T-glass fabric, L-glass fabric or Q-glass fabric, wherein the fiber may comprise yarns and rovings, in spread form or standard form. Non-woven fabric preferably comprises liquid crystal polymer non-woven fabric, such as polyester non-woven fabric, polyurethane non-woven fabric and so on, but not limited thereto. Woven fabric may also comprise liquid crystal polymer woven fabric, such as polyester woven fabric, polyurethane woven fabric and so on, but not limited thereto. The reinforcement material may increase the mechanical strength of the prepreg. In one preferred embodiment, the reinforcement material can be optionally pretreated by a silane coupling agent. The prepreg may be further heated and cured to the C-stage to form an insulation layer.

For example, the resin composition from each embodiment of this disclosure can be used to make a resin film, which is prepared by heating and baking to semi-cure the resin composition. The resin composition may be selectively coated on a polyethylene terephthalate film (PET film), a polyimide film (PI film), a copper foil or a resin-coated copper, followed by heating and baking to semi-cure the resin composition to form the resin film.

For example, the resin composition from each embodiment of this disclosure can be used to make a laminate, which comprises two metal foils and an insulation layer disposed between the metal foils, wherein the insulation layer is made by curing the resin composition at high temperature and high pressure to the C-stage, a suitable curing temperature being for example between 180° C. and 240° C. and preferably between 200° C. and 220° C. and a suitable curing time being 80 to 150 minutes and preferably 90 to 120 minutes. The insulation layer may be formed by curing the aforesaid prepreg or resin film to the C-stage. The metal foil may comprise copper, aluminum, nickel, platinum, silver, gold or alloy thereof, such as a copper foil. In one embodiment, the laminate is a copper-clad laminate (CCL).

In addition, the laminate may be further processed by trace formation processes to make a circuit board, such as a printed circuit board.

In one embodiment, the resin composition disclosed herein may achieve improvement in one or more of the following properties: dielectric constant, dissipation factor, copper foil peeling strength and warpage at high temperature.

For example, the resin composition according to the present disclosure or the article made therefrom may achieve one, more or all of the following properties:

a dielectric constant as measured by reference to JIS C2565 at 10 GHz of less than or equal to 2.77, such as between 2.52 and 2.77 or between 2.52 and 2.54;

a dissipation factor as measured by reference to JIS C2565 at 10 GHz of less than or equal to 0.00168, such as between 0.00108 and 0.00168 or between 0.00108 and 0.00142;

a copper foil peeling strength as measured by reference to IPC-TM-650 2.4.8 of greater than or equal to 3.31 lb/in, such as between 3.31 lb/in and 3.48 lb/in; and a warpage as measured after 30 minutes of thermal treatment at 200° C. of less than or equal to 1.93 mm, such as between 1.53 mm and 1.93 mm or between 1.53 mm and 1.56 mm.

Various polymers were prepared according to the amount of major reactants (monomers) listed in Table 1 and Table 2 and the descriptions in Preparation Example 1 to Preparation Example 13. In addition, raw materials below were used to prepare the resin compositions of various Examples and Comparative Examples of the present disclosure according to the amount listed in Table 3 to Table 5 and further fabricated to prepare test samples.

Materials and reagents used in Preparation Examples of polymer and Examples and Comparative Examples of resin composition disclosed herein are listed below:

Polymers P1 to P13: as described in Preparation Examples 1 to 13.

BMI-TMH: 1,6-bismaleimide-(2,2,4-trimethyl) hexane, available from Daiwakasei Industry Co., Ltd.

MIR-5000: maleimide resin of Formula (3), wherein 1≤k≤5, available from Nippon Kayaku.

Formula (3)

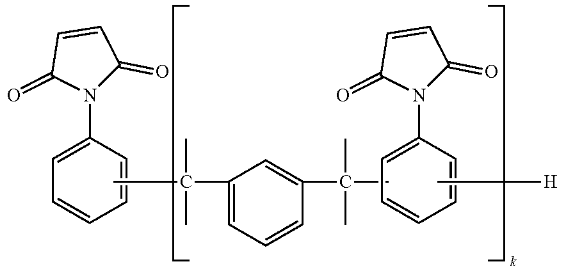

BMI-2300: polyphenylmethane maleimide, available from Daiwakasei Industry Co., Ltd.

BAP: 2,2-bis(3-amino-4-hydroxyphenyl) propane, commercially available. 6FAP: 2,2-bis(3-amino-4-hydroxyphenyl) hexafluoropropane, commercially available.

BAS: bis(3-amino-4-hydroxyphenyl) sulfone, commercially available.

Primer 1075-1: diamine compound of Formula (4-1), available from Tong Sing Chemicals Co., Ltd.

Formula (4-1)

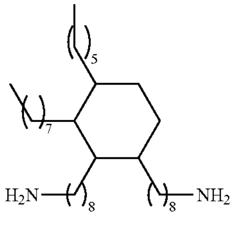

Primer 1075-2: diamine compound of Formula (4-2), available from Tong Sing Chemicals Co., Ltd.

Formula (4-2)

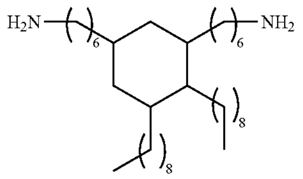

Primer 1075-3: diamine compound of Formula (4-3), available from Tong Sing Chemicals Co., Ltd.

Formula (4-3)

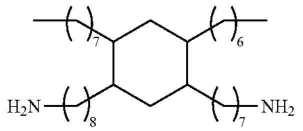

TFMB: 2,2'-bis(trifluoromethyl)benzidine, commercially available.

VBC: 4-vinylbenzyl chloride, commercially available.

Compound of Formula (5): as described in Preparation Example 14.

Formula (5)

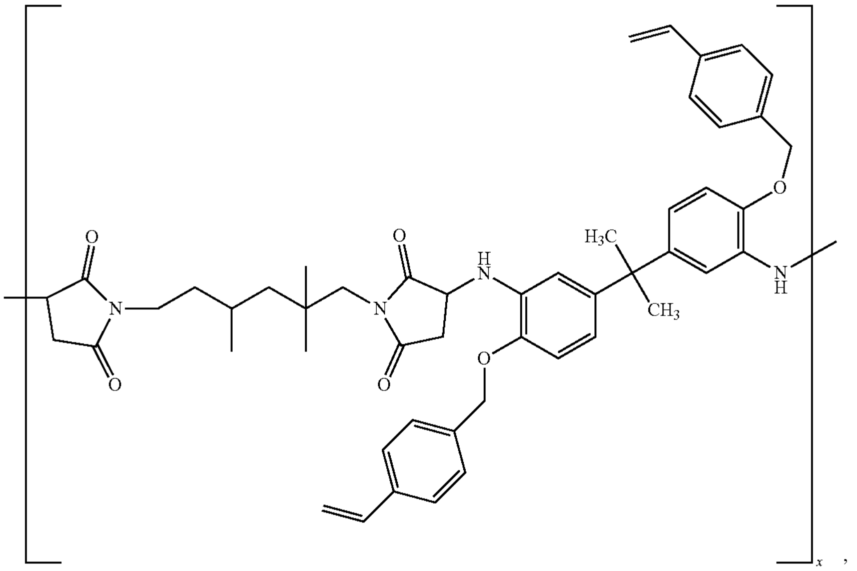

wherein x represents a repeating number of the unit, having a weight average molecular weight of about 56,000.

Compound of Formula (6): as described in Preparation Example 15.

Formula (6)

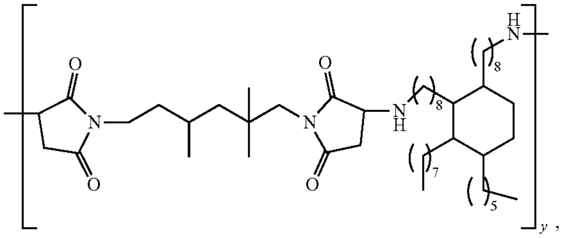

wherein y represents a repeating number of the unit, having a weight average molecular weight of about 56,000.

CW-PVE: as shown by Formula (7), available from COORWIN CO., LTD.

Formula (7)

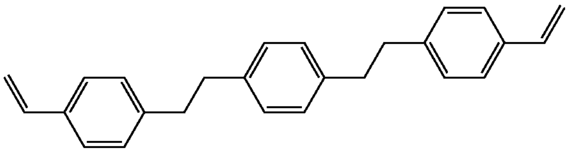

CW-PPVE: as shown by Formula (8), available from COORWIN CO., LTD.

Formula (8)

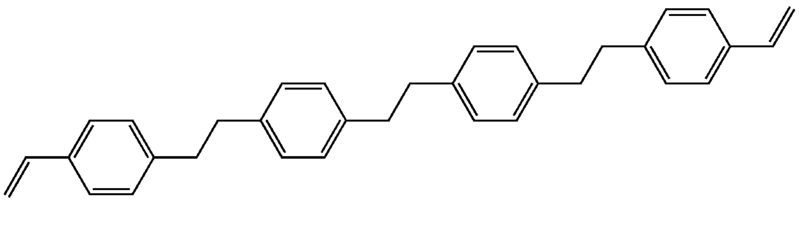

SC-2050: spherical silica, available from Admatechs.

25B: 2,5-dimethyl-2,5-di(tert-butylperoxy)-3-hexyne, available from NOF Corporation.

Anisole: commercially available.

Various polymers were prepared according to the descriptions as below, wherein the monomers and the amount thereof used for polymerization are listed in Table 1 and Table 2.

Preparation Example 1

2 moles of BMI-TMH, 0.6 mole of BAP, 0.4 mole of Primer 1075-1 and 100 ml of solvent (such as anisole) were added into a three-necked flask and stirred continuously to obtain a mixture solution. The mixture solution was heated from room temperature to 120° C. and continuously stirred for 6 hours, followed by increasing the temperature to 155° C. and adding 1 mole of VBC to react for 4 hours. Finally, 0.1 wt % to 1 wt % of 1,4-benzenediol relative to the total amount of the aforementioned raw materials (excluding solvent) was added to quench the reaction so as to obtain the Polymer P1 of the present disclosure, having a weight average molecular weight of about 56,000. The Polymer P1 was analyzed by gel permeation chromatography (GPC), and the results were shown in the sole FIG. 1.

Preparation Example 2

Substantially the same as Preparation Example 1, but the difference from Preparation Example 1 is that in Preparation Example 2, Primer 1075-1 was replaced by Primer 1075-2 to obtain the Polymer P2 of the present disclosure, having a weight average molecular weight of about 56,000.

Preparation Example 3

Substantially the same as Preparation Example 1, but the difference from Preparation Example 1 is that in Preparation Example 3, Primer 1075-1 was replaced by Primer 1075-3 to obtain the Polymer P3 of the present disclosure, having a weight average molecular weight of about 56,000.

Preparation Example 4

Substantially the same as Preparation Example 1, but the difference from Preparation Example 1 is that in Preparation Example 4, BAP was replaced by 6FAP to obtain the Polymer P4 of the present disclosure, having a weight average molecular weight of about 56,000.

Preparation Example 5

Substantially the same as Preparation Example 1, but the difference from Preparation Example 1 is that in Preparation Example 5, BMI-TMH was replaced by MIR-5000 to obtain the Polymer P5 of the present disclosure, having a weight average molecular weight of about 56,000.

Preparation Example 6

Substantially the same as Preparation Example 1, but the difference from Preparation Example 1 is that in Preparation Example 6, the mixture solution was heated from room temperature to 120° C. and continuously stirred for 3 hours to obtain the Polymer P6 of the present disclosure, having a weight average molecular weight of about 30,000.

Preparation Example 7

Substantially the same as Preparation Example 1, but the difference from Preparation Example 1 is that in Preparation Example 7, the mixture solution was heated from room temperature to 120° C. and continuously stirred for 8 hours to obtain the Polymer P7 of the present disclosure, having a weight average molecular weight of about 70,000.

Preparation Example 8

Substantially the same as Preparation Example 1, but the difference from Preparation Example 1 is that in Preparation Example 8, 0.7 mole of BAP and 0.3 mole of Primer 1075-1 were added to obtain the Polymer P8 of the present disclosure, having a weight average molecular weight of about 56,000.

Preparation Example 9

Substantially the same as Preparation Example 1, but the difference from Preparation Example 1 is that in Preparation Example 9, 0.8 mole of BAP and 0.2 mole of Primer 1075-1 were added to obtain the Polymer P9 of the present disclosure, having a weight average molecular weight of about 56,000.

Preparation Example 10

Substantially the same as Preparation Example 1, but the difference from Preparation Example 1 is that in Preparation Example 10, Primer 1075-1 was replaced by TFMB to obtain the Polymer P10, having a weight average molecular weight of about 56,000.

Preparation Example 11

Substantially the same as Preparation Example 5, but the difference from Preparation Example 5 is that in Preparation Example 11, BAP was replaced by BAS to obtain the Polymer P11, having a weight average molecular weight of about 56,000.

Preparation Example 12

Substantially the same as Preparation Example 1, but the difference from Preparation Example 1 is that VBC was not used in Preparation Example 12 so as to obtain the Polymer P12, having a weight average molecular weight of about 56,000.

Preparation Example 13

Substantially the same as Preparation Example 9, but the difference from Preparation Example 9 is that in Preparation Example 13, BMI-TMH was replaced by BMI-2300 to obtain the Polymer P13 of the present disclosure, having a weight average molecular weight of about 56,000.

Preparation Example 14

1 mole of BMI-TMH, 1 mole of BAP and 50 ml of anisole were added into a three-necked flask and stirred continuously to obtain a mixture solution. The mixture solution was heated from room temperature to 120° C. and continuously stirred for 6 hours, followed by increasing the temperature to 155° C. and adding 1 mole of VBC to react for 4 hours.

Finally, 0.1 wt % to 1 wt % of 1,4-benzenediol relative to the total amount of the aforementioned raw materials (excluding solvent) was added to quench the reaction so as to obtain the compound of Formula (5), having a weight average molecular weight of about 56,000.

Preparation Example 15

1 mole of BMI-TMH, 1 mole of Primer 1075-1 and 50 ml of anisole were added into a three-necked flask and stirred continuously to obtain a mixture solution. The mixture solution was heated from room temperature to 120° C. and continuously stirred for 6 hours so as to obtain the compound of Formula (6), having a weight average molecular weight of about 56,000.

TABLE 1

| Monomers and amounts (mole) thereof used in preparing different polymers | | | | | | | |
|---|---|---|---|---|---|---|---|
| Polymer | P1 | P2 | P3 | P4 | P5 | P6 | P7 |
| BMI-TMH | 2 | 2 | 2 | 2 | | 2 | 2 |
| MIR-5000 | | | | | 2 | | |
| BMI-2300 | | | | | | | |
| BAP | 0.6 | 0.6 | 0.6 | | 0.6 | 0.6 | 0.6 |
| 6FAP | | | | 0.6 | | | |
| BAS | | | | | | | |
| Primer 1075-1 | 0.4 | | | 0.4 | 0.4 | 0.4 | 0.4 |
| Primer 1075-2 | | 0.4 | | | | | |
| Primer 1075-3 | | | 0.4 | | | | |
| TFMB | | | | | | | |
| VBC | 1 | 1 | 1 | 1 | 1 | 1 | 1 |

TABLE 2

| Monomers and amounts (mole) thereof used in preparing different polymers | | | | | | |
|---|---|---|---|---|---|---|
| Polymer | P8 | P9 | P10 | P11 | P12 | P13 |
| BMI-TMH | 2 | 2 | 2 | | 2 | |
| MIR-5000 | | | | 2 | | |
| BMI-2300 | | | | | | 2 |
| BAP | 0.7 | 0.8 | 0.6 | | 0.6 | 0.8 |
| 6FAP | | | | | | |
| BAS | | | | 0.6 | | |
| Primer 1075-1 | 0.3 | 0.2 | | 0.4 | 0.4 | 0.2 |
| Primer 1075-2 | | | | | | |
| Primer 1075-3 | | | | | | |
| TFMB | | | 0.4 | | | |
| VBC | 1 | 1 | 1 | 1 | | 1 |

Compositions (in part by weight) and test results of resin compositions of Examples and Comparative Examples are listed below, wherein the part by weight refers to the amount, in part by weight, of each component with a solid content of 100%. For example, Example E1 contains 100 parts by weight of Polymer P1, indicating the amount of Polymer P1, with a solid content of 100%, is 100 parts by weight.

TABLE 3

| Resin compositions of Examples (in part by weight) and test results | | | | | | | | |
|---|---|---|---|---|---|---|---|---|
| Component | Name | E1 | E2 | E3 | E4 | E5 | E6 | E7 |
| Polymer | P1 | 100 | | | | | | |
| | P2 | | 100 | | | | | |
| | P3 | | | 100 | | | | |
| | P4 | | | | 100 | | | |
| | P5 | | | | | 100 | | |
| | P6 | | | | | | 100 | |
| | P7 | | | | | | | 100 |
| | P8 | | | | | | | |
| | P9 | | | | | | | |
| | P10 | | | | | | | |
| | P11 | | | | | | | |
| | P12 | | | | | | | |
| | P13 | | | | | | | |
| | Formula (5) | | | | | | | |
| | Formula (6) | | | | | | | |
| additive | CW-PVE | | | | | | | |
| | CW-PPVE | | | | | | | |
| inorganic filler | SC-2050 | 120 | 120 | 120 | 120 | 120 | 120 | 120 |
| initiator | 25B | 1 | 1 | 1 | 1 | 1 | 1 | 1 |
| solvent | anisole | 100 | 100 | 100 | 100 | 100 | 100 | 100 |
| Property | Unit | E1 | E2 | E3 | E4 | E5 | E6 | E7 |
| dielectric constant | none | 2.77 | 2.75 | 2.72 | 2.75 | 2.73 | 2.74 | 2.65 |
| dissipation factor | none | 0.00168 | 0.00167 | 0.00163 | 0.00164 | 0.00161 | 0.00164 | 0.00155 |
| copper foil peeling strength | lb/in | 3.45 | 3.48 | 3.41 | 3.39 | 3.33 | 3.36 | 3.31 |
| warpage at high temperature | mm | 1.84 | 1.81 | 1.79 | 1.82 | 1.93 | 1.79 | 1.87 |

TABLE 4

Resin compositions of Examples (in part by weight) and test results

| Component | Name | E8 | E9 | E10 | E11 | E12 | E13 | E14 |
|---|---|---|---|---|---|---|---|---|
| Polymer | P1 | | | | 100 | 100 | 10 | 17 |
| | P2 | | | | | | 10 | 12 |
| | P3 | | | | | | 17 | 15 |
| | P4 | | | | | | 10 | 11 |
| | P5 | | | | | | 10 | 11 |
| | P6 | | | | | | 15 | 13 |
| | P7 | | | | | | 7 | 9 |
| | P8 | 100 | | | | | 13 | 6 |
| | P9 | | 100 | | | | 8 | 6 |
| | P10 | | | | | | | |
| | P11 | | | | | | | |
| | P12 | | | | | | | |
| | P13 | | | 100 | | | | |
| | Formula (5) | | | | | | | |
| | Formula (6) | | | | | | | |
| additive | CW-PVE | | | | 5 | | 5 | 15 |
| | CW-PPVE | | | | | 5 | 10 | 15 |
| inorganic filler | SC-2050 | 120 | 120 | 120 | 120 | 120 | 100 | 150 |
| initiator | 25B | 1 | 1 | 1 | 1 | 1 | 0.5 | 2 |
| solvent | anisole | 100 | 100 | 100 | 100 | 100 | 80 | 120 |

| Property | Unit | E8 | E9 | E10 | E11 | E12 | E13 | E14 |
|---|---|---|---|---|---|---|---|---|
| dielectric constant | none | 2.68 | 2.62 | 2.77 | 2.54 | 2.52 | 2.54 | 2.52 |
| dissipation factor | none | 0.00158 | 0.00150 | 0.00168 | 0.00142 | 0.00139 | 0.00112 | 0.00108 |
| copper foil peeling strength | lb/in | 3.39 | 3.41 | 3.45 | 3.41 | 3.36 | 3.45 | 3.47 |
| warpage at high temperature | mm | 1.91 | 1.93 | 1.86 | 1.53 | 1.55 | 1.54 | 1.56 |

TABLE 5

Resin compositions of Comparative Examples (in part by weight) and test results

| Component | Name | C1 | C2 | C3 | C4 | C5 |
|---|---|---|---|---|---|---|
| Polymer | P1 | | | | | |
| | P2 | | | | | |
| | P3 | | | | | |
| | P4 | | | | | |
| | P5 | | | | | |
| | P6 | | | | | |
| | P7 | | | | | |
| | P8 | | | | | |
| | P9 | | | | | |
| | P10 | 100 | | | | |
| | P11 | | 100 | | | |
| | P12 | | | 100 | | |
| | P13 | | | | | |
| | Formula (5) | | | | 100 | |
| | Formula (6) | | | | | 100 |
| additive | CW-PVE | | | | | |
| | CW-PPVE | | | | | |
| inorganic filler | SC-2050 | 120 | 120 | 120 | 120 | 120 |
| initiator | 25B | 1 | 1 | 1 | 1 | 1 |
| solvent | anisole | 100 | 100 | 100 | 100 | 100 |

| Property | Unit | C1 | C2 | C3 | C4 | C5 |
|---|---|---|---|---|---|---|
| dielectric constant | none | 3.14 | 3.28 | 3.52 | 3.03 | 3.07 |
| dissipation factor | none | 0.00286 | 0.00312 | 0.00432 | 0.00214 | 0.00258 |
| copper foil peeling strength | lb/in | 2.28 | 2.51 | 1.96 | 1.56 | 2.46 |
| warpage at high temperature | mm | 3.41 | 3.63 | 3.75 | 3.23 | 3.35 |

Samples (specimens) for the properties measured above were prepared as described below and tested and analyzed under specified conditions below.

1. Prepreg (PP)

Resin composition (in part by weight) from each Example or each Comparative Example was separately added to a stirred tank and well-mixed to form a varnish. Then the varnish was loaded to an impregnation tank, and a fiberglass fabric (e.g., 1078 L2-glass fiber fabric, available from Asahi) was impregnated into the impregnation tank to adhere the resin composition onto the fiberglass fabric, followed by heating at 100° C. to 120° C. to the semi-cured state (B-stage) to obtain a prepreg, having a resin content of about 70%.

2. Copper-Containing Laminate 1 (Obtained by Laminating Two Prepregs)

Two 0.5 oz hyper very low profile (HVLP) copper foils and two prepregs obtained from 1078 L2-glass fiber fabrics impregnated with each Example or Comparative Example were prepared, each prepreg having a resin content of about 70%. A copper foil, two prepregs and a copper foil were superimposed in such order and then subjected to a vacuum condition for lamination at 250 psi to 600 psi and 200° C. to 220° C. for 90 minutes to 120 minutes to form each copper-containing laminate 1. The two prepregs were cured to form an insulation layer between the two copper foils, and the insulation layer has a resin content of about 70%.

3. Copper-Containing Laminate 2 (Obtained by Laminating Six Prepregs)

The preparation processes were substantially the same as those described in the copper-containing laminate 1, except that the insulation layer was made from six prepregs.

4. Copper-Free Laminate 1 (Obtained by Laminating Two Prepregs)

Each copper-containing laminate 1 made by laminating two prepregs obtained above was etched to remove the copper foils on both sides so as to obtain the copper-free laminate 1 (obtained by laminating two prepregs).

5. Copper-Free Laminate 2 (Obtained by Laminating Six Prepregs)

Each copper-containing laminate 2 made by laminating six prepregs obtained above was etched to remove the copper foils on both sides so as to obtain the copper-free laminate 2 (obtained by laminating six prepregs).

For each sample, test items and test methods are described below.

Dielectric Constant (Dk)

The aforesaid copper-free laminate 1 (obtained by laminating two prepregs, resin content of about 70%) was subject to dielectric constant measurement. Each sample was measured by using a microwave dielectrometer (available from AET Corp.) by reference to JIS C2565 at room temperature (about 25° C.) and under 10 GHz frequency to obtain the dielectric constant. Lower dielectric constant represents better dielectric properties of the sample. Under a 10 GHz frequency, for a low Dk material, a difference in Dk of less than 0.15 represents no substantial difference (i.e., no significant technical difficulty) in dielectric constant in different laminates, and a difference in Dk of greater than or equal to 0.15 represents a significant difference (i.e., significant technical difficulty) in dielectric constant in different laminates.

Dissipation Factor (Df)

The aforesaid copper-free laminate 1 (obtained by laminating two prepregs, having a resin content of about 70%) was subject to dissipation factor measurement. Each sample was measured by using a microwave dielectrometer (available from AET Corp.) by reference to JIS C2565 at room temperature (about 25° C.) and under 10 GHz frequency to obtain the dissipation factor. Lower dissipation factor represents better dielectric properties of the sample. Under a 10 GHz frequency, for a Df value of between 0.0010 and 0.0030, a difference in Df of less than 0.0005 represents no substantial difference (i.e., no significant technical difficulty) in dissipation factor of laminates, and a difference in Df of greater than or equal to 0.0005 represents a significant difference (i.e., significant technical difficulty) in dissipation factor in different laminates.

Copper Foil Peeling Strength (0.5 Oz Peeling Strength, 0.5 Oz P/S)

A copper-containing laminate 2 (obtained by laminating six prepregs) was cut into a rectangular sample with a width of 24 mm and a length of 80 mm, which was etched to remove surface copper foil to leave a rectangular copper foil with a width of 3.18 mm and a length of greater than 60 mm, and tested by using a tensile strength tester by reference to IPC-TM-650 2.4.8 at room temperature (about 25° C.) to measure the 0.5-ounce (half-ounce) copper foil peeling strength (0.5 oz P/S, in lb/in). In the technical field to which the present disclosure pertains, higher copper foil peeling strength is better. Generally, laminates with a resin content of about 70% having a difference in copper foil peeling strength (0.5-ounce) of greater than or equal to 0.3 lb/in represents a substantial difference (i.e., significant technical difficulty) in copper foil peeling strength (0.5-ounce) in different laminates.

Warpage at High Temperature

A copper-free laminate 2 (obtained by laminating six prepregs) was prepared and cut into a sample with a length of 10 cm and a width of 10 cm, which was subject to the measurement of the warpage after 30 minutes of thermal treatment at 200° C. The measurement method was to place the aforementioned sample on a marble platform, and a height gauge was used to measure the vertical distance (in mm) from one corner with the maximum warpage to the plane of the marble. In the warpage measurement, the number of samples was 6, and the average distance was taken. In the technical field to which the present disclosure pertains, lower warpage at high temperature is better. Generally, a difference in warpage at high temperature of greater than or equal to 0.2 mm represents a substantial difference (i.e., significant technical difficulty) in different samples.

The following observations can be made from Table 3 to Table 5.

In contrast with examples using the polymer of the present disclosure (Examples E1-E14), Comparative Examples C1-C5 using other polymers fail to achieve satisfactory results in at least one property including dielectric constant, dissipation factor, copper foil peeling strength and warpage at high temperature. In contrast with Comparative Examples C1 to C5, Examples E1 to E14 using the polymer of the present disclosure can achieve at the same time a lower dielectric constant (a dielectric constant at 10 GHz as measured by reference to JIS C2565 of less than or equal to 2.77), a lower dissipation factor (a dissipation factor at 10 GHz as measured by reference to JIS C2565 of less than or equal to 0.00168), a higher copper foil peeling strength (a copper foil peeling strength as measured by reference to IPC-TM-650 2.4.8 of greater than or equal to 3.31 lb/in) and a lower warpage at high temperature (a warpage as measured after 30 minutes of thermal treatment at 200° C. of less than or equal to 1.93 mm). In addition, if the polymer of the present disclosure and one or more multi-functional aromatic vinyl group-containing compounds are used at the same time, further improvements can be obtained in at least one or more of the aforementioned properties.

The above detailed description is merely illustrative in nature and is not intended to limit the embodiments of the subject matter or the application and use of such embodiments. As used herein, the term "exemplary" means "serving as an example, instance, or illustration." Any implementation described herein as exemplary is not necessarily to be construed as preferred or advantageous over other implementations.

Moreover, while at least one exemplary example or comparative example has been presented in the foregoing detailed description, it should be appreciated that a vast number of variations exist. It should also be appreciated that the exemplary one or more embodiments described herein are not intended to limit the scope, applicability, or configuration of the claimed subject matter in any way. Rather, the foregoing detailed description will provide those skilled in the art with a convenient guide for implementing the described one or more embodiments. Also, various changes can be made in the function and arrangement of elements without departing from the scope defined by the claims, which include known equivalents and foreseeable equivalents at the time of filing this patent application.

What is claimed is:

1. A resin composition, comprising a polymer which has a first structural unit of Formula (1) and a second structural unit of Formula (2):

Formula (1)

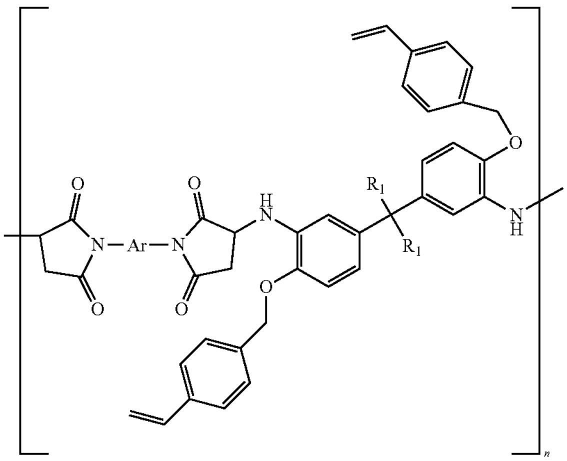

-continued

Formula (2)

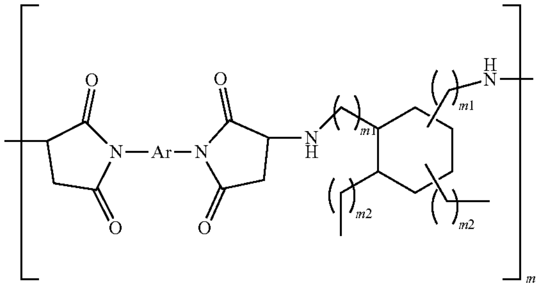

wherein Ar are the same or different and independently represent a divalent organic group; $R_1$ are the same or different and independently represent a methyl group or a trifluoromethyl group; m1 are the same or different and independently represent an integer of 6 to 8; m2 are the same or different and independently represent an integer of 5 to 8; and n/m is between 1 and 3 inclusively, such that the polymer has a weight average molecular weight of between 30,000 and 70,000 inclusively.

2. The resin composition of claim 1, further comprising inorganic filler, flame retardant, curing accelerator, polymerization inhibitor, solvent, silane coupling agent, coloring agent, toughening agent or a combination thereof.

3. The resin composition of claim 1, further comprising a multi-functional aromatic vinyl group-containing compound.

4. The resin composition of claim 3, comprising 100 parts by weight of the polymer and 5 to 30 parts by weight of the multi-functional aromatic vinyl group-containing compound.

5. The resin composition of claim 3, wherein the multi-functional aromatic vinyl group-containing compound comprises a compound of Formula (7), a compound of Formula (8) or a combination thereof:

Formula (7)

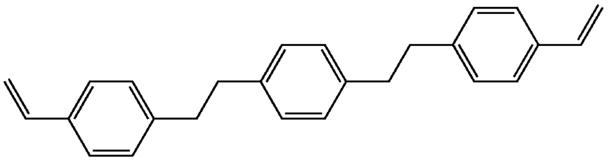

Formula (8)

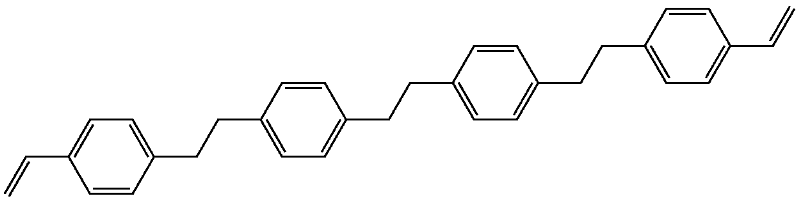

.

6. An article made from the resin composition of claim 1, comprising a prepreg, a resin film, a laminate or a printed circuit board.

7. The article of claim 6, having a dielectric constant at 10 GHz as measured by reference to JIS C2565 of less than or equal to 2.77.

8. The article of claim 6, having a dissipation factor at 10 GHz as measured by reference to JIS C2565 of less than or equal to 0.00168.

9. The article of claim 6, having a copper foil peeling strength as measured by reference to IPC-TM-650 2.4.8 of greater than or equal to 3.31 lb/in.

10. The article of claim 6, having a warpage as measured after 30 minutes of thermal treatment at 200° C of less than or equal to 1.93 mm.

* * * * *